(12) United States Patent
Razavi et al.

(10) Patent No.: US 11,903,005 B2
(45) Date of Patent: Feb. 13, 2024

(54) MULTIPLE RADIO ACCESS TECHNOLOGIES INTERFERENCE REDUCTION

(71) Applicant: VODAFONE IP LICENSING LIMITED, Newbury (GB)

(72) Inventors: Razieh Razavi, London (GB); Timothy James Frost, London (GB); Alper Ucar, London (GB)

(73) Assignee: VODAFONE IP LICENSING LIMITED

( * ) Notice: Subject to any disclaimer, the term of this patent is extended or adjusted under 35 U.S.C. 154(b) by 147 days.

(21) Appl. No.: 17/440,584

(22) PCT Filed: Mar. 19, 2020

(86) PCT No.: PCT/EP2020/057698
§ 371 (c)(1),
(2) Date: Sep. 17, 2021

(87) PCT Pub. No.: WO2020/188062
PCT Pub. Date: Sep. 24, 2020

(65) Prior Publication Data
US 2022/0201702 A1    Jun. 23, 2022

(30) Foreign Application Priority Data
Mar. 20, 2019   (EP) ..................... 19382201

(51) Int. Cl.
*H04W 72/54*    (2023.01)
*H04L 1/1607*   (2023.01)
(Continued)

(52) U.S. Cl.
CPC ........... *H04W 72/54* (2023.01); *H04L 1/1621* (2013.01); *H04L 1/1854* (2013.01);
(Continued)

(58) Field of Classification Search
CPC . H04W 72/54; H04W 72/1215; H04W 88/06; H04L 1/1621; H04L 1/1854;
(Continued)

(56) References Cited

U.S. PATENT DOCUMENTS

| | | | |
|---|---|---|---|
| 2018/0332603 A1* | 11/2018 | Takeda | ................ H04W 72/04 |
| 2020/0163095 A1* | 5/2020 | Kim | ..................... H04W 72/12 |
| 2021/0258096 A1* | 8/2021 | Mann | ................ H04W 72/1268 |

OTHER PUBLICATIONS

Guangdong Oppo Mobile Telecom: "Discussion on the NR-LTE self-interference issue", 3GPP Draft; R1-1713294, 3rd Generation Partnership Project (3GPP), Mobile Competence Centre; 650, Route Des Lucioles; F-06921, Sophia-Antipolis Cedex, France, vol. RAN WG1, No. Prague, Czech Republic; Aug. 21, 2017-Aug. 25, 2017, Aug. 20, 2017, XP051316101, Retrieved from the Internet: URL: www.3gpp.org/ftp/Meetings_EGPP_SYNC/RAN1/Docs/ [retrieved on Aug. 20, 2017].

(Continued)

*Primary Examiner* — Sharmin Chowdhury
(74) *Attorney, Agent, or Firm* — WORKMAN NYDEGGER

(57) ABSTRACT

A method is provided for operating a station for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal, wherein transmissions from the station using the first carrier signal cause interference to reception at the station over the second, TDD RAN. The method comprises aligning a timing of transmissions from the station over the first, FDD RAN to a timing for transmissions from the station over the second, TDD RAN.

11 Claims, 4 Drawing Sheets

(51) Int. Cl.
*H04L 1/1829* (2023.01)
*H04L 5/00* (2006.01)
*H04W 72/12* (2023.01)

(52) U.S. Cl.
CPC .......... *H04L 5/0042* (2013.01); *H04L 5/0055* (2013.01); *H04L 5/0094* (2013.01); *H04W 72/1215* (2013.01)

(58) Field of Classification Search
CPC ... H04L 5/0042; H04L 5/0055; H04L 5/0094; H04L 5/0005
See application file for complete search history.

(56) References Cited

OTHER PUBLICATIONS

International Search Report and Written Opinion for PCT/EP2020/057698 dated Jun. 18, 2020.

Qualcomm Incorporated: "Nr Lte Coexistence Consideration", 3GPP Draft; R1-1713477 NR-LTE Coexistence Consideration, $3^{rd}$ Generation Partnership Project (3GPP), Mobile Competence Centre, 650, Route Des Lucioles, F-06921 Sophia-Antipolis Cedex, France, vol. RAN WG1, No. Prague, CZ, Aug. 21, 2017-Aug. 25, 2017, Aug. 20, 2017, XP051316277, retrieved from the internet: URL: http://www.3gpp.org/ftp/Meetings_3GPP_SYNC/RAN1/Docs/ [retrieved on Aug. 20, 2017].

Vivo: "Design of backhaul signaling for harmonic interference handling", 3GPP Draft; R3-173860, 3rd Generation Partnership Project (3GPP), Mobile Competence Centre; 650, Route Des Lucioles; F-06921 Sophia-Antipolis Cedex, France, vol. RAN WG3, No. Prague, Czech Republic, Oct. 9, 2017-Oct. 13, 2017, Oct. 9, 2017 (Oct. 9, 2017), XP051344284, retrieved from the internet: URL: http:/www.3gpp.org/ltp/Meetings_3GPP_SYNC/RAN3/Docs/ [retrieved on Oct. 9, 2017].

\* cited by examiner

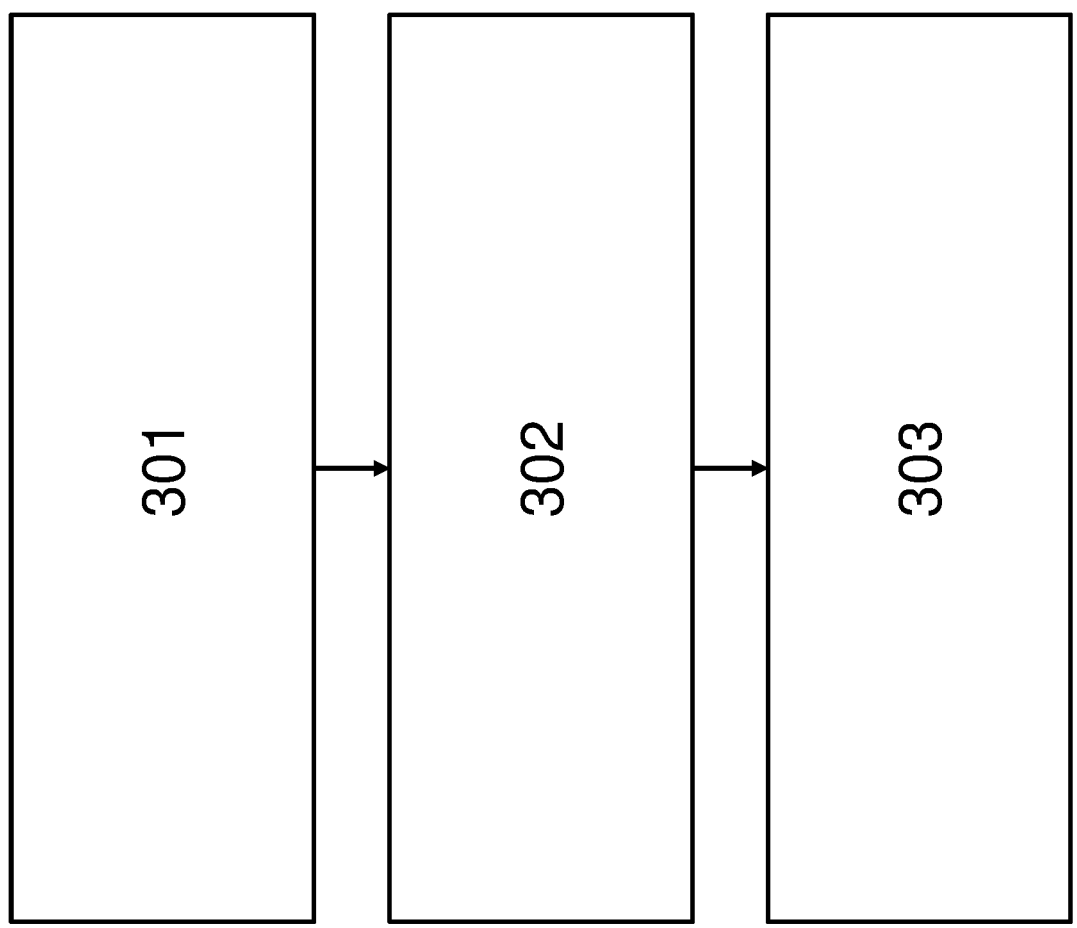

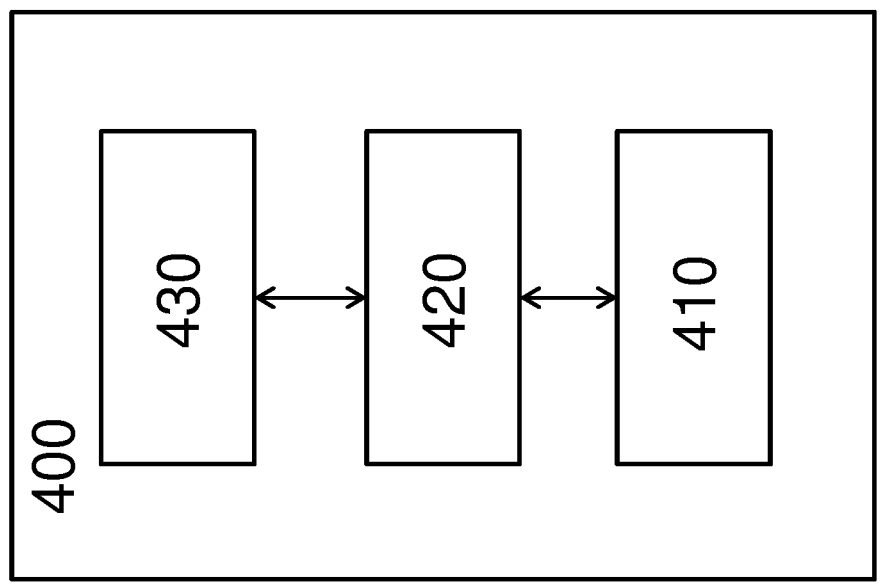

US 11,903,005 B2

MULTIPLE RADIO ACCESS TECHNOLOGIES INTERFERENCE REDUCTION

CROSS-REFERENCE TO RELATED APPLICATIONS

The present application is a 371 US Nationalization of International Patent Application No. PCT/EP2020/057698, filed Mar. 19, 2020, which claims priority to EP Patent Application No. 19382201.2, filed Mar. 20, 2019, the entire disclosures of which are incorporated herein by reference.

FIELD OF THE DISCLOSURE

The present disclosure relates to operation of a station in a network, such as a cellular network, particularly a mobile station (User Equipment).

BACKGROUND TO THE DISCLOSURE

The use of two Radio Access Networks (RANs) for increased data rate over an air interface is well established. For example, Carrier Aggregation (CA) or Dual Connectivity (DC) configurations are known, especially for Long Term Evolution (LTE) cellular network architectures. Such configurations require the simultaneous transmission and/or reception of multiple carriers. At least one carrier may be in respect of a Frequency Division Duplex (FDD) RAN and at least one carrier may be in respect of a Time Division Duplex (TDD) RAN.

It is possible to implement such multi-carrier configurations, including implementations using Multiple Radio Access Technologies (RATs). Some examples of multi-carrier configurations are LTE/NR CA, LTE-DC and a Multi-RAT DC mode (MR-DC), for example as specified in Third Generation Partnership Project (3GPP) TS 37.340. In MR-DC, one or more carriers may use a LTE RAN (with most bands allocated for this RAT being specified for FDD operation) and one or more carriers may use a NR RAN (typically TDD). In such implementations, a transceiver (which for these purposes may include a separate transmitter and receiver) transmits and receives signals in different frequency bands. For instance, at least one carrier may be transmitted at a frequency in a first frequency band and at least one carrier may be transmitted at a frequency in a second, different frequency band. The second frequency band may be much higher than the first frequency band. For instance, LTE RANs may operate in a 1.8 GHz frequency band and NR RANs may operate in a 3.5 GHz frequency band.

Such scenarios may result in interference, particularly harmonic interference at the receiver (or receive chain of the transceiver and any references to receiver below may include this). Harmonic interference occurs when the receive frequency is an integer multiple of the transmit frequency and may be a particular concern in the example above, in which the NR RAN may operate at harmonic frequency (or close to a harmonic frequency) of an LTE RAN carrier. Such harmonic interference may severely affect receiver performance, as the LTE FDD transmission (especially on the uplink) may cause interference to the NR TDD air interface, especially on the downlink. Successful operation of such CA or DC modes desirably mitigates and/or minimises this interference.

SUMMARY OF THE DISCLOSURE

Against this background, the present disclosure provides a method for operating a station according to claim 1 and according to claim 12, a method of configuring a station according to claim 9 and a station for a cellular network (for instance, a UE, mobile station, relay or a base station) in line with claim 15. Other preferred features are disclosed with reference to the claims and in the description below.

The approach of the disclosure uses two Radio Access Networks (RANs): a first, Frequency Division Duplex (FDD) RAN using a first carrier signal; and a second, Time Division Duplex (TDD) RAN. The FDD RAN carrier signal and TDD RAN carrier signal are at different frequencies, with the TDD RAN carrier signal being the higher frequency and typically much higher, for example on different frequency bands and/or at least twice the FDD RAN carrier signal. In particular, the frequency (or frequency band) of the TDD RAN carrier signal may be (approximately) a harmonic (integer multiple) of the frequency (or frequency band) of the FDD RAN carrier signal.

In any event, transmissions from a station (for instance the mobile station, in the uplink) using the FDD RAN carrier signal cause interference to reception at the station over the TDD RAN, for example, harmonic interference. However, the station is to operate for simultaneous communication over both the FDD RAN and TDD RAN, such as in a multiple carrier configuration, for instance using a Carrier Aggregation (CA) or a Dual Connectivity (DC) functionality (dual uplink or dual downlink operation). The term "station" as used herein may be a mobile station (or User Equipment, UE or similar) or a base station (eNB, gNB or similar), relay and/or a Remote Radio Head (RRH) Remote Radio Unit (RRU) or similar and may include a transceiver, higher protocol layer components and other parts to allow operation in a network, particularly a cellular network, for example based on 3GPP standards. It is noteworthy that at least some stations providing a relay functionality may also be considered as base stations, if for example they are being seen as a base station by mobile devices and/or network nodes.

In the approach of the disclosure, a timing of (all) Receipt Acknowledgement message, such as Automatic Repeat Request (ARQ), transmissions or in fact all transmissions from the station over the FDD RAN is aligned (for instance, by setting, adjusting, coordinating or synchronising) with timing for transmissions (such as ARQ transmissions from the station over the TDD RAN. Conversely, transmissions (at least ARQ transmission, but preferably all transmissions of any type) may not made by the station over the FDD RAN during time slots when the station is receiving over the TDD RAN. Beneficially, this means that each ARQ transmission may not always made a fixed (predetermined) number of time slots after transmission and/or receipt of the respective message to which it relates. Where the station is a User Equipment (UE), such as a mobile station, the uplink ARQ transmissions (or all uplink transmissions) are thereby aligned with the uplink time slots for the TDD RAN. In this way, interference from ARQ transmissions (or any uplink transmission) over the FDD RAN to reception at the station over the TDD RAN is at least reduced or mitigated and preferably avoided. A dual uplink (in which both the FDD RAN uplink and TDD RAN uplink are simultaneously utilised) is maintained, with the subsequent capacity benefits. These advantages would equally apply to a dual downlink (in which both the FDD RAN downlink and TDD RAN downlink are simultaneously utilised) at a base station, mutatis mutandis.

In another aspect, the receiving station (and/or a method of operating such a receiving station) may be considered, which is configured to receive such aligned transmissions over two RANs. In that case, the receiving station may align (alternatively, coordinate or synchronise) a timing for receiving transmissions over the first, FDD RAN to a timing for receiving transmissions at the station over the second, TDD RAN. In uplink case, the receiving station would be a base station. Any of the features described herein with reference to the transmission may conversely be considered with respect to reception. Also, the combination of this aspect with any other aspect described herein may also be considered. In the preferred approach, FDD RAN ARQ transmissions are delayed or advanced and the delayed or advanced FDD RAN ARQ transmissions are transmitted in a same time slot as (ARQ) transmissions in respect of the second, TDD RAN. This may be implemented using Transmission Time Interval (TTI) bundling, for example.

Control signalling (such as RRC signalling) may be provided, over either the FDD RAN or the TDD RAN. This aspect of the disclosure may be considered independently from or in combination with other aspects as herein described. Such control signalling beneficially instructs a station, in particular a UE, to align a timing of transmissions from the station over the first, FDD RAN to a timing for transmissions from the station over the second, TDD RAN. A method of communicating this instruction may thus be considered. The control signalling may optionally indicate the possibility of interference, in particular an indication that the frequency (band) of the TDD carrier signal is approximately a harmonic of the frequency of the FDD RAN carrier signal. In any case, the alignment of timing of at least ARQ transmissions (and in some cases, all uplink transmissions) may be performed in response to receiving the control signalling. The control signalling may also indicate the timing to be used.

In the preferred embodiment, FDD RAN and the TDD RAN use different Radio Access Technologies (RATs), for instance, the FDD RAN may be a Long Term Evolution (LTE) RAN and the TDD RAN may be a New Radio (NR) RAN.

BRIEF DESCRIPTION OF THE DRAWINGS

The approach of the disclosure may be put into practice in various ways, one of which will now be described by way of example only and with reference to the accompanying drawings in which:

FIG. 3 illustrates a flow chart in line with an embodiment of the disclosure; and FIG. 4 schematically depicts an example of a station for use with an embodiment of the disclosure.

DETAILED DESCRIPTION OF ONE OR MORE PREFERRED EMBODIMENTS

The example discussed above, in which one or more carriers may use a FDD LTE RAN in a 1.8 GHz band and one or more carriers may use a TDD NR RAN in a 3.5 GHz band, will be used for illustrating the disclosure below. In this example, there will likely be a fixed configuration of time instances, in which the TDD channel is used for transmission with other fixed time instances where the channel is used for reception. This means that while a transceiver is transmitting over the 3.5 GHz frequency band, it cannot simultaneously be receiving on the same 3.5 GHz frequency band. For simplicity, the configuration at the User Equipment (UE) or mobile station will be considered, but it will be recognised that the corresponding situation at the RAN can conversely be considered. In the case of MR-DC, the RANs may comprise two base stations (one for the LTE FDD RAN and one for the NR TDD RAN) connected over an X2 or Xn Interface.

When the transceiver is operating in a 1800 MHz frequency band using a FDD LTE RAN, a fixed timing is provided between receiving data in one direction and transmitting control information to acknowledge correct delivery of the data in the other direction, using Automatic Repeat Request (ARQ) transmissions. For the example below, a timing of three subframes will be used.

Figure 1:
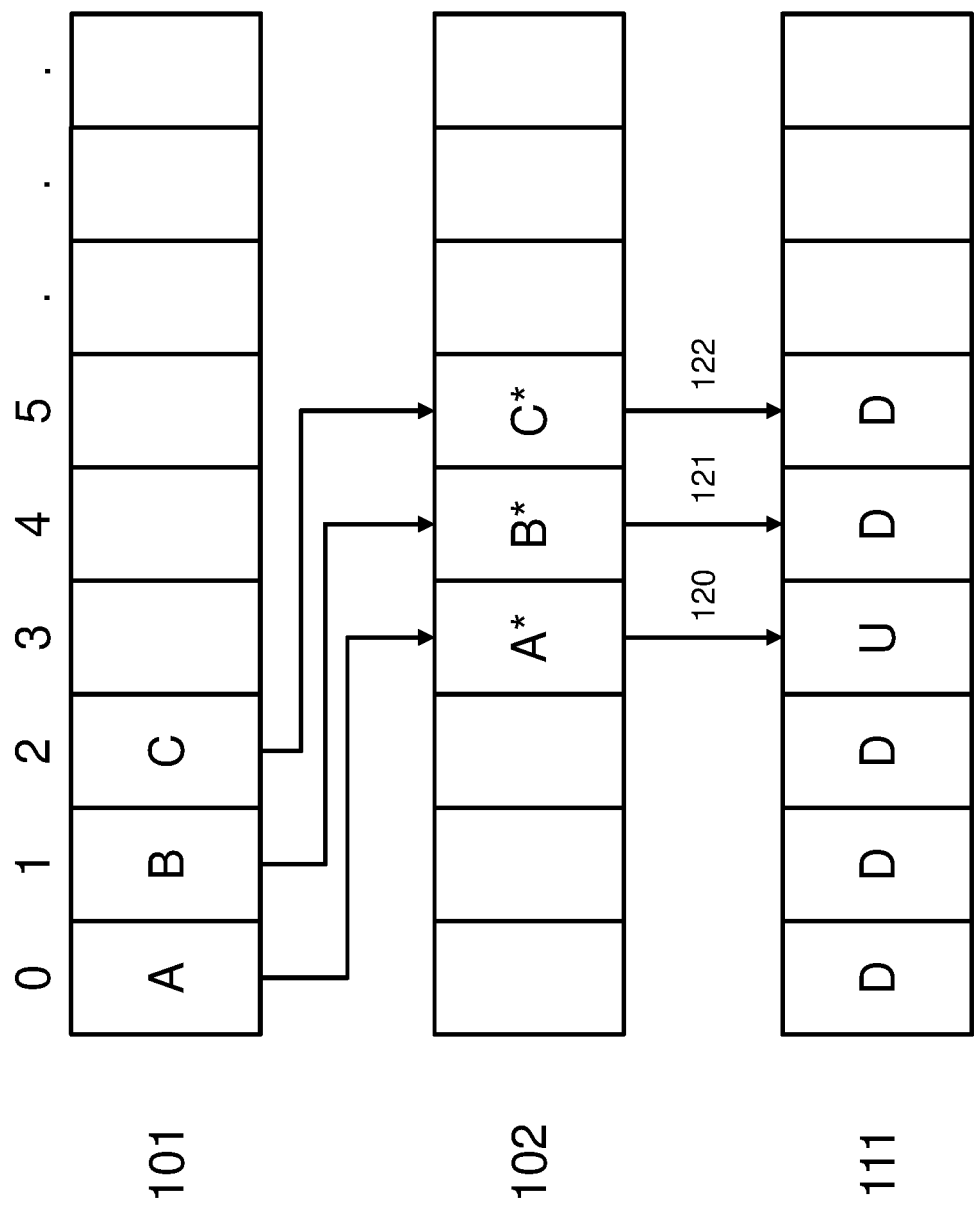
FIG. 1 shows a schematic diagram of example transmission timings for a first, FDD RAN and a second TDD RAN.

This is illustrated with reference to FIG. 1, in which there is shown a schematic diagram of example transmission timings (across a frame of 5 ms duration, for instance) for a first, FDD RAN and a second TDD RAN. The subframes are numbered across the top from 0 (i.e. 0, 1, 2, 3, 4, . . . ). In the FDD RAN downlink 101, a first transmission A is made in subframe 0, a second transmission B is made in subframe 1 and a third transmission C is made in subframe 2. In the FDD RAN uplink 102, a first acknowledgment A* (which may be a ACK or NACK message) in respect of the first transmission A is made in subframe 3, a second acknowledgment B* in respect of the second transmission B is made in subframe 4 and a third acknowledgment C* in respect of the third transmission C is made in subframe 5. It will be seen that, in respect of the NR TDD system 111, the uplink U is provided every fourth subframe and each other subframe is for the downlink D. Thus, the transmission of the first acknowledgment A* does not affect the NR TDD system 111 uplink subframe 3, as shown by arrow 120, but the transmission of the second acknowledgment B* does affect the NR TDD system 111 uplink subframe 4, as shown by arrow 121 and the transmission of the third acknowledgment C* does affect the NR TDD system 111 uplink subframe 5, as shown by arrow 122.

The approach taken by the present disclosure aims to avoid FDD RAN transmission does causing an impact to the TDD RAN reception. This is achieved by the transceiver transmitting over the FDD RAN uplink (in the example shown) only during the time instances when the TDD RAN band is also used for transmission (and therefore not receiving signals). The fixed timing restriction for LTE FDD ARQ would mean that such an approach would restrict the time instances in which the device can receive downlink data on FDD. This could result in losses in LTE RAN downlink throughput. To mitigate this issue, ARQ on the FDD RAN is configured to use the transmission timing of the TDD RAN. In particular, the FDD RAN may use the Hybrid ARQ (HARQ) transmission timing of the TDD RAN, such that (in the example of FIG. 1) the UL transmissions on the FDD RAN are synchronised with the uplink transmissions on the TDD band. This may be implemented using Transmission Time Interval (TTI) bundling.

Figure 2:
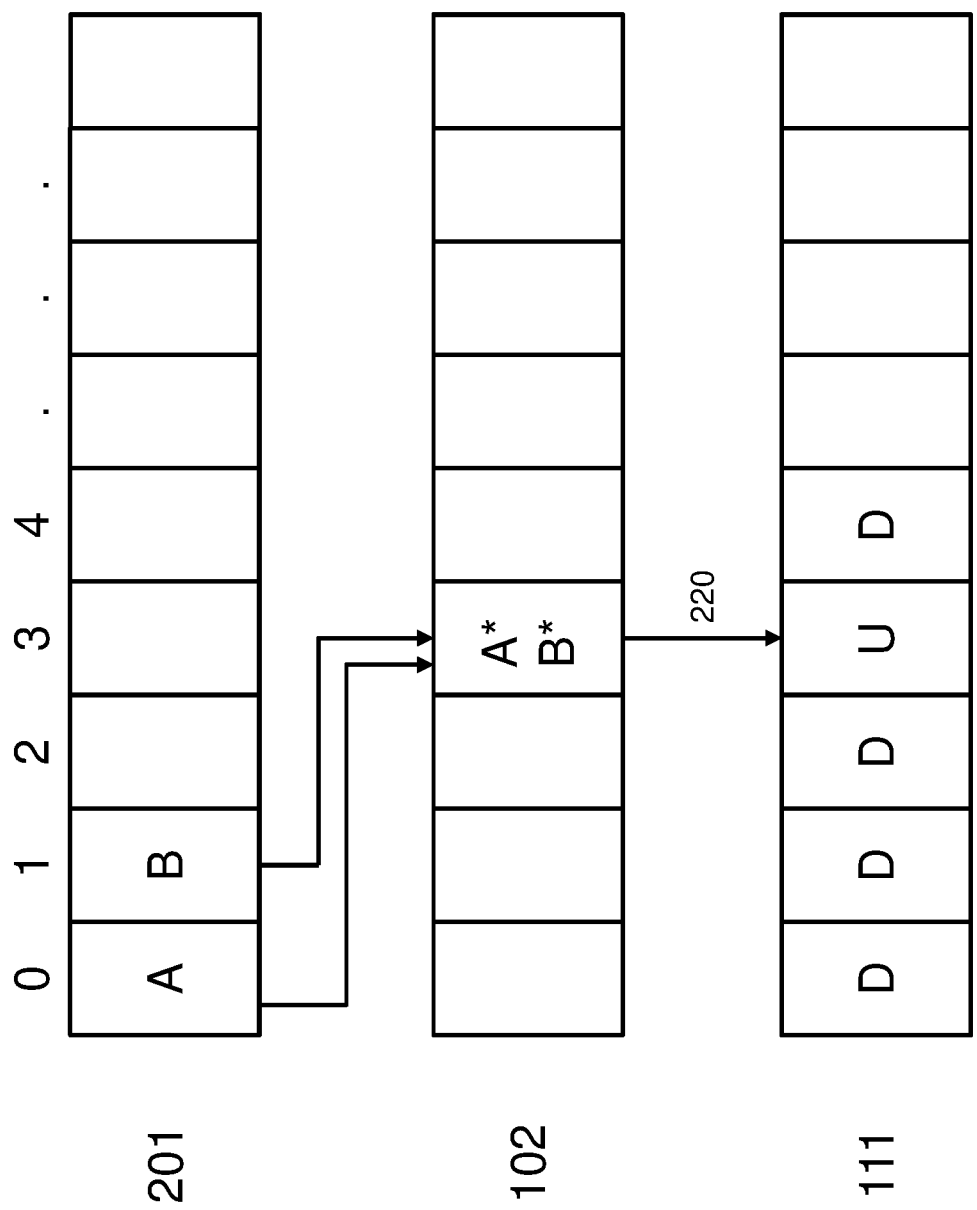
FIG. 2 depicts a schematic diagram of transmission timings for a first, FDD RAN and a second TDD RAN according to an embodiment of the disclosure.

With reference to FIG. 2, there is depicted a schematic diagram of transmission timings for a first, FDD RAN and a second TDD RAN according to an embodiment of the disclosure. As with FIG. 1, in the FDD RAN downlink 201, a first transmission A is made in subframe 0 and a second transmission B is made in subframe 1. However, the fixed timing for ARQ is relaxed. In the FDD RAN uplink 202, a first acknowledgment A* in respect of the first transmission A and a second acknowledgment B* in respect of the second transmission B are both made in subframe 3. Thus, the transmission of the first acknowledgment A* and the second acknowledgment B* do not affect the NR TDD system 111 uplink subframe 3, as shown by arrow 220.

This approach allows flexible timing (such as bundling) of HARQ ACK or NACK messages for multiple subframes and sending these on limited uplink subframes, at time instances where the TDD downlink is not being received by the UE or mobile station. The TDD configuration to be operated will be signalled to the mobile station by RRC control signalling, as discussed below. Although the above has been discussed with reference to a mobile station or UE, in which the timing of FDD uplink ARQ transmissions is aligned with the TDD RAN uplink, it will be appreciated that in a network node, such as a base station, the timing of FDD downlink ARQ transmissions may be aligned with the TDD RAN downlink. It should be noted that, in systems based on 3GPP standards, the base station (eNB or gNB) determines the scheduling of uplink transmissions or the scheduling of uplink transmissions is predetermined in a standard. Therefore, a UE does not have a specific uplink scheduler. The UE executes or performs a transmission in accordance with an instruction from the network or a standard.

The result of this approach provide a semi-static configuration of a device for a first, FDD RAN (such as LTE) carrier with a second, TDD RAN uplink configuration, such that the FDD RAN uplink transmissions coincide (only) with uplink transmissions on the TDD RAN by the same device. The FDD RAN uplink transmissions do not coincide with TDD RAN downlink transmissions.

In general terms, there may be considered a method for operating a station (in a cellular network, for example) for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal (for example, in a different frequency band). A station (such as a mobile station, UE, a relay, a Remote Radio Head/Unit (RRH/RRU), a relay and/or a base station, such as a eNB or gNB), configured to operate in accordance with the method, may also be considered. In the context of the present disclosure, a station may include one or more of a transceiver, antenna system, scheduler (particularly in a base station), transmission configuration (in particular, implementing scheduling commands or instructions at a UE from the network), other physical layer components, higher protocol layer components and other parts to allow operation in a network, particularly a cellular network, for example based on 3GPP standards. In addition, a computer program (for example, stored on a computer readable medium), logic (which may programmable) or other system configuration, configured to operate in accordance with the method, may be provided.

Transmissions from the station using the first carrier signal cause interference to reception at the station over the second, TDD RAN. The method comprises aligning a timing of (all) transmissions from the station over the first, FDD RAN to a timing for transmissions (such as ARQ transmissions) from the station over the second, TDD RAN. This may be performed so as to avoid interference from transmissions over the first, FDD RAN to reception at the station over the second, TDD RAN. Aligning is beneficially an active step that may comprise one or more of: setting; adjusting; coordinating; synchronising; and other similar concepts.

This timing may particularly apply to Receipt Acknowledgement message transmissions, such ACK/NACK messages. For instance, this may comprise aligning a timing of at least Receipt Acknowledgement message transmissions from the station over the first, FDD RAN to a timing for transmissions (including Receipt Acknowledgement message transmissions) from the station over the second, TDD RAN, in particular such that the timing of a Receipt Acknowledgement message transmission is not (always) made a fixed (predetermined) time (for example, with reference to time slots, such as a number of subframes) after transmission and/or receipt of the message to which it relates. Receipt Acknowledgement message transmissions may be part of an Automatic Repeat Request (ARQ) scheme, which may include a Hybrid ARQ (HARQ) protocol.

In another sense, a method may be considered in which the station operates in one of two modes (and may select between the modes). In a first mode, used when no TDD/FDD interference is expected, a predetermined (or fixed) timing is used for Receipt Acknowledgement message transmissions from the station on the first, FDD RAN relative to transmissions from the station on the first, FDD RAN (for example, the Receipt Acknowledgement message is transmitted a predetermined or fixed number of time slots after a message being acknowledged or repeat requested is transmitted). A fixed timing for ARQ has generally been preferred as it is less complex to implement, requires less signalling and therefore less overhead. Latency may also be reduced if a separate Receipt Acknowledgement message transmission (ACK/NACK) is made for each sub-frame. In a second mode, in which interference is possible, a timing for Receipt Acknowledgement message transmissions on the first, FDD RAN is based on a timing for making transmission from the station on the second, TDD RAN.

Aligning a timing of ARQ transmissions optionally comprises delaying or advancing ARQ transmissions in respect of the first, FDD RAN. In particular, this may be compared with a fixed, predetermined timing for Receipt Acknowledgement message transmissions, as discussed above. This is advantageously such that the delayed or advanced ARQ transmissions in respect of the first, FDD RAN are transmitted in a same time slot as transmissions in respect of the second, TDD RAN. The step of aligning a timing of ARQ transmissions may comprise Transmission Time Interval (TTI) bundling of the ARQ transmissions in respect of the first, FDD RAN.

The frequency of the second carrier signal and the frequency of the first carrier signal are preferably in different frequency bands. For example, the frequency of the second carrier signal may be at least twice the frequency of the first carrier signal. The transmissions from the station using the first carrier signal may thus cause harmonic interference to reception at the station over the second, TDD RAN. In that case, the frequency of the second carrier signal may be approximately a harmonic (that is, integer multiple) of the frequency of the first carrier signal.

The first, FDD RAN and the second, TDD RAN may use different Radio Access Technologies (RATs). For example, the first, FDD RAN may be a Long Term Evolution (LTE) RAN and the second, TDD RAN may be a New Radio (NR) RAN. Advantageously, the station operates using the first carrier and the second carrier to provide a multiple carrier functionality, such as Carrier Aggregation (CA) or Dual Connectivity (DC).

It will also be understood that for each transmitting station on a particular side of a link (for example, uplink or downlink), a corresponding configuration may be implemented at the receiving station on the other side of the link. For example, the receiver should be aware of the mode in which the transmitting station is operating, so that it can be looking for the transmissions (such as ACK/NACK messages, or similar) at the right time slot.

In general terms, in a further aspect, this may be considered a method for operating a station for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal. The frequency of the second carrier signal is approximately a harmonic of the frequency of the first carrier signal. The method comprises aligning a timing for receiving transmissions at the station over the first, FDD RAN to a timing for receiving transmissions at the station over the second, TDD RAN. It may be appreciated that, in respect of the uplink, the station in this aspect may be a base station.

In respect of this aspect, receiver features corresponding with any of the optional, preferable or otherwise advantageous transmitter features described herein may be provided. For example, this approach may be applied in respect of reception of one or more Receipt Acknowledgement (such as ARQ) messages and/or different types of RAT.

The approach taken in the disclosure is similar to that described in International Patent Publication No. WO-2018/174766, the details of which are incorporated by reference. The approach taken in this document is intended to address a different issue from that considered by the present disclosure, specifically Inter-Modulation Distortion (IMD). IMD is a specific form of interference and is quite different from other types of interference, such as harmonic interference, as considered by the present disclosure. This is because IMD is caused by simultaneous transmission of two or more carriers generating additional components at the sum and difference frequencies of the carrier frequencies and at sums and differences of multiples of those carrier frequencies. IMD may result from simultaneous operation over a FDD RAN and a TDD RAN that operate in the same frequency band, such that a station can communicate with both RANs using a single carrier signal. To address the IMD issue, simultaneous uplink transmissions on the FDD RAN and the TDD RAN are avoided. This can be achieved by TTI bundling of ARQ messages in the FDD RAN. In this approach, a single uplink is effectively implemented and the simultaneous dual uplink is lost. Whilst there are similarities with this approach and the approach of the present disclosure, it will be appreciated that there are also significant differences, as outlined above.

An alternative approach to that taken in the present disclosure could be to restrict the transmission over the FDD RAN to ensure that there is no respective feedback transmitted at the time that the TDD RAN channel is receiving. This would cause difficulties, however. In particular, there may be a significant reduction in throughput over the FDD RAN. Moreover, it may require transmission synchronisation at multiple stations. For example, when a NR TDD RAN is operating on a 3.5 GHz band, base stations of for a LTE FDD RAN and NR TDD RAN may not dynamically communicate with one another. Such an approach would also limit throughput to the station (for instance, on the downlink, where the station is a UE or mobile station). Therefore, a static configuration would be required for the LTE carrier.

Next, referring to FIG. 3, there is illustrated a flow chart in line with an embodiment of the disclosure. In a first step 301, the station receives an indication to use a multiple carrier (such as CA or DC) configuration.

In a second step 302, the station receives an indication that interference (such as harmonic interference) between the FDD RAN and TDD RAN is possible and/or an indication of a TDD RAN transmission timing. Such an indication may be provided by signalling in a Media Access Control (MAC) Layer and/or in Radio Resource Control (RRC) Connection Setup or reconfiguration. For example, a configuration similar to that shown below may be employed, used when power control or IMD issues require single uplink transmission as specified in 3GPP TS 38.101-3 and 3GPP TS 38.213. A new Information Element, similar to "tdm-PatternConfig" may be implemented, for example.

```
RRCConnectionReconfiguration-v1510-IEs ::= SEQUENCE {
    nr-Config-r15              CHOICE {
        release                    NULL,
        setup                      SEQUENCE {
            endc-ReleaseAndAdd-r15     BOOLEAN,
            nr-SecondaryCellGroupConfig-r15   OCTET STRING
                                           OPTIONAL, -- Need ON
            p-MaxEUTRA-r15             P-Max
                                           OPTIONAL -- Need ON
        }
    }                              OPTIONAL, -- Need ON
    sk-Counter-r15             INTEGER (0.. 65535)
                                           OPTIONAL, -- Need ON
    nr-RadioBearerConfig1-r15      OCTET STRING
                                           OPTIONAL, -- Need ON
    nr-RadioBearerConfig2-r15      OCTET STRING
                                           OPTIONAL -- Need ON
    tdm-PatternConfig-r15      CHOICE {
        release                    NULL,
        setup                      SEQUENCE {
            subframeAssignment-r15     SubframeAssignment-r15,
            harq-Offset-r15            INTEGER (0.. 9)
        }
    }
}
```

This may therefore incorporate new signalling from the network to the UE mobile device, for example providing an uplink/downlink reference configuration indicating the time during which the UE (for example, configured with EN-DC) may transmit. For example, update of RAN1 and RAN2 (such as 3GPP TS 36.331 and/or 3GPP TS 38.331) may be employed.

In step 303, a timing of ARQ transmissions from the station over FDD RAN is aligned to a timing for transmissions from the station over the TDD RAN. This is so as to avoid interference from ARQ transmissions over the FDD RAN to reception at the station over the TDD RAN.

Returning to the general terms described above, where the station is a UE, mobile station or another type of station as discussed above, the method may further comprise receiving a control signal at the station and/or sending a control signal to the station (for instance, over the first, FDD RAN or the second, TDD RAN) to instruct the station to align a timing of transmissions from the station over the first, FDD RAN to a timing for transmissions from the station over the second, TDD RAN. The control signal may additionally or alternatively indicate that the frequency of the second carrier signal is (approximately or around) a harmonic of the frequency of the first carrier signal. In any event, the step of aligning a timing of ARQ transmissions may be performed in response to receiving the control signal. The control signal may comprise a RRC and/or MAC signal. The control signal optionally further indicates the timing for transmissions over the second, TDD RAN.

In another aspect, there may be considered a method of signalling to and/or configuring a station, such as User Equipment (UE), mobile station or other type of station in a cellular network. The station may be configured or configurable for multiple carrier operation over a first FDD RAN, for instance using a first carrier signal, and a second TDD RAN, for instance using a second carried signal, operating in different frequency bands and/or with the TDD RAN at a higher frequency (such as a harmonic) of the operation frequency of the FDD RAN. The method comprises communicating a downlink control signal to the station (preferably over the first, FDD RAN) to instruct the station to align a timing of transmissions from the station over the first, FDD RAN to a timing for transmissions from the station over the second, TDD RAN. Additionally or alternatively, the control signal may indicate that the frequency of the second TDD RAN is (approximately) a harmonic of the frequency of the first carrier signal and/or indicate a timing for transmissions over the second, TDD RAN for adoption by the station in respect of the first, FDD RAN. Then, alignment of a timing of ARQ transmissions at the station in respect of the first, FDD RAN to the timing of transmissions by the station over the second, TDD RAN may be performed in response to receiving the control signal. The control signal may comprise a RRC and/or MAC signal. This method may be performed by a network node, such as a base station, a remote radio head or unit or a relay (in which case, the step of communicating may comprise transmitting or sending) or at a UE, mobile station or other type of station (in which case, the step of communicating may comprise receiving).

With reference to FIG. 4, there is schematically shown an example of a station for use with an embodiment of the disclosure. The station 400 comprises: a processor 410; a transceiver 420; and an antenna arrangement 430. In a transmission path, a signal from the processor 410 may be passed to the transceiver 420 for modulation and the transmission is then provided to the antenna arrangement 430 for sending. Conversely in a reception path, a transmission is received using the antenna arrangement 430 and the received signal is passed to the transceiver 420 for detection and/or demodulation. The detected and/or demodulated signal is then provided to the processor 410. It will be understood that, although a single transmission and reception path using transceiver 420 is shown, this may be replaced by separate transmission and reception paths, for instance using an individual transmitter and receiver. The components may be collocated, for example, but this need not be so (for instance, with the use of a RRH/RRU). Such a station may be used for a UE, a network node (base station) or relay. The skilled person will further appreciate that this is only an example of a station for use with the disclosure and other examples may be considered, for example as discussed herein.

Although a specific embodiment has now been described, the skilled person will understand that various modifications and variations are possible. Also, combinations of any specific features shown with reference to one embodiment or with reference to multiple embodiments are also provided, even if that combination has not been explicitly detailed herein.

Particular variations may include the different RANs and/or RATs used, the specific configuration of frames and/or subframes and the way in which transmission timings are aligned. Also, whilst this disclosure describes an approach for mitigating harmonic interference, it may be applicable to other types of interference cause by a FDD RAN transmission causing interference to the TDD RAN receiver at the same location or in a close or proximate location (for example within the same station or tower or in stations or towers in the vicinity of each other) and/or within the same station (such as for the UE). Base stations may optionally communicate with each other within a transparent container over the core network using S1, N2 or another interface.

The invention claimed is:

1. A method for operating a station for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal, wherein transmissions from the station using the first carrier signal cause interference to reception at the station over the second, TDD RAN, the method comprising:

aligning a timing of Receipt Acknowledgement message transmissions from the station over the first, FDD RAN to a timing for transmissions from the station over the second, TDD RAN; and wherein the step of aligning comprises delaying or advancing Receipt Acknowledgement messages transmissions in respect of the first, FDD RAN compared with a fixed, predetermined timing for Receipt Acknowledgement messages transmissions by Transmission Time Interval (TTI) bundling of the Receipt Acknowledgement messages transmissions in respect of the first, FDD RAN, such that the delayed or advanced Receipt Acknowledgement messages transmissions in respect of the first, FDD RAN are transmitted in a same time slot as transmissions in respect of the second, TDD RAN.

2. The method of claim 1, wherein the frequency of the second carrier signal is at least twice the frequency of the first carrier signal.

3. The method of claim 1, wherein the transmissions from the station using the first carrier signal cause harmonic interference to reception at the station over the second, TDD RAN and the frequency of the second carrier signal is approximately a harmonic of the frequency of the first carrier signal.

4. The method of claim 1, wherein the station operates using the first carrier and the second carrier to provide Carrier Aggregation (CA) or Dual Connectivity (DC) functionality.

5. The method of claim 4, further comprising:

receiving a control signal at the station instructing the station to align a timing of transmissions from the station over the first, FDD RAN to a timing for transmissions from the station over the second, TDD RAN; and wherein the step of aligning a timing of transmissions is performed in response to receiving the control signal.

6. The method of claim 1, wherein the station is a User Equipment (UE), mobile station or relay.

7. The method of claim 1, wherein the first, FDD RAN and the second, TDD RAN use different Radio Access Technologies (RATs).

8. The method of claim 5, wherein the control signal further indicates the timing for transmissions over the second, TDD RAN.

9. A method for configuring a station for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal, wherein transmissions from the station using the first carrier signal cause interference to reception at the station over the second, TDD RAN, the method comprising:

communicating a downlink control signal to the station, the control signal instructing the station to align a timing of Receipt Acknowledgement messages transmissions from the station over the first, FDD RAN to a timing for transmissions from the station over the second, TDD RAN by delaying or advancing Receipt Acknowledgement message transmissions in respect of the first, FDD RAN compared with a fixed, predetermined timing for Receipt Acknowledgement message transmissions by Transmission Time Interval (TTI) bundling of the Receipt Acknowledgement message transmissions in respect of the first, FDD RAN, such that the delayed or advanced Receipt Acknowledgement message transmissions in respect of the first, FDD RAN are transmitted in a same time slot as transmissions in respect of the second, TDD RAN.

10. The method of claim 9, wherein the control signal further indicates the timing for Receipt Acknowledgement message transmissions over the second, TDD RAN.

11. A station for a cellular network, the station comprising:

a processor configured to operate the station for simultaneous communication over: a first, Frequency Division Duplex (FDD) Radio Access Network (RAN) using a first carrier signal; and a second, Time Division Duplex (TDD) RAN using a second carrier signal at a higher frequency than a frequency of the first carrier signal, wherein transmissions from the station using the first carrier signal cause interference to reception at the station over the second, TDD RAN;

wherein the processor is further configured to align a timing of transmissions from the station over the first, FDD RAN to a timing for transmissions from the station over the second, TDD RAN, and wherein the aligning comprises delaying or advancing Receipt Acknowledgement messages transmissions in respect of the first, FDD RAN compared with a fixed, predetermined timing for Receipt Acknowledgement messages transmissions by Transmission Time Interval (TTI) bundling of the Receipt Acknowledgement messages transmissions in respect of the first, FDD RAN, such that the delayed or advanced Receipt Acknowledgement messages transmissions in respect of the first, FDD RAN are transmitted in a same time slot as transmissions in respect of the second, TDD RAN.

* * * * *